Figure 1:
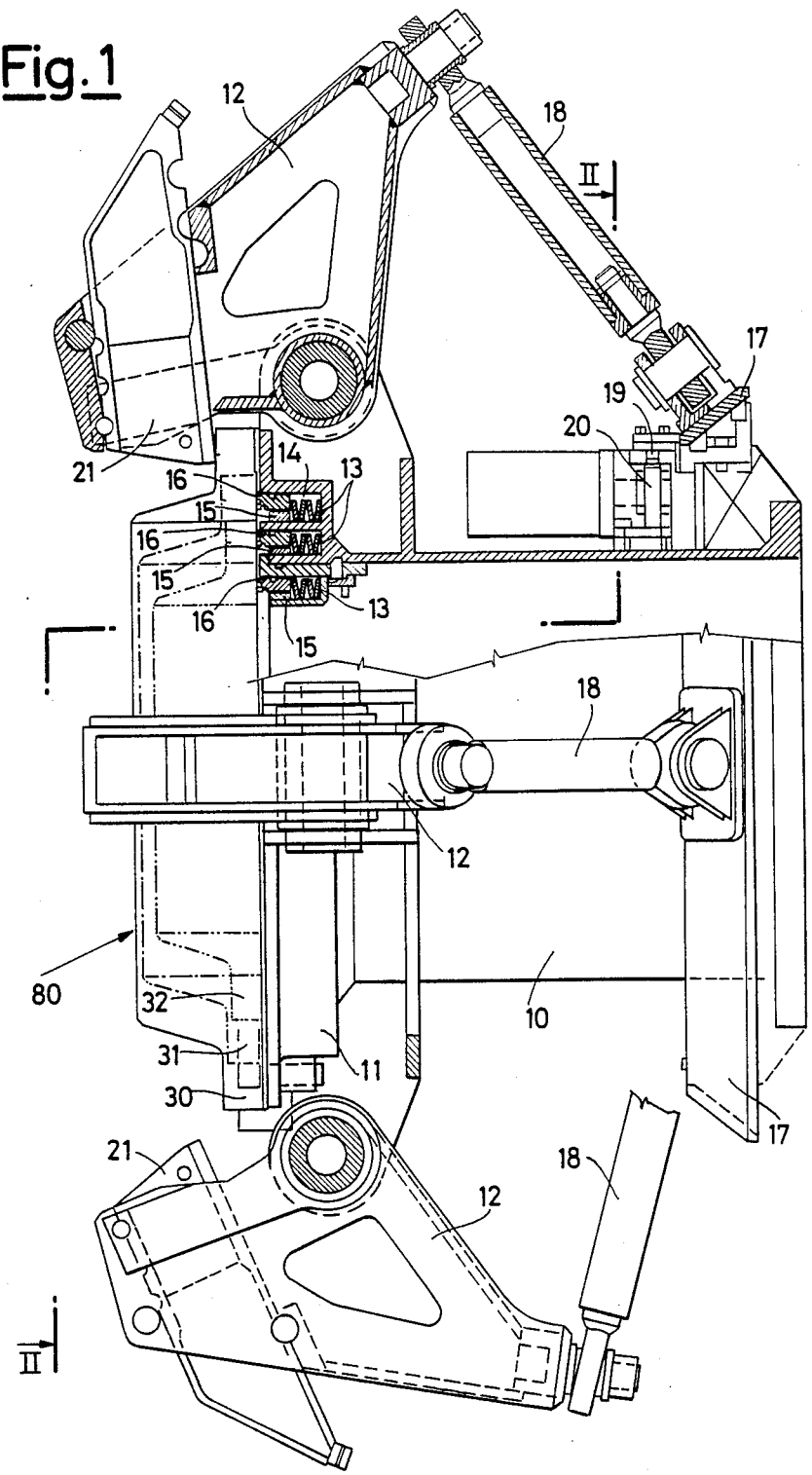

United States Patent [19]

Bormioli

[11] Patent Number: 4,923,219
[45] Date of Patent: May 8, 1990

[54] QUICK COUPLING DEVICE FOR DUCTS

[76] Inventor: Giorgio Bormioli, Via Galileo Galilei, 21, 35100 Padova, Italy

[21] Appl. No.: 144,038

[22] Filed: Jan. 15, 1988

[30] Foreign Application Priority Data

Jan. 21, 1987 [IT] Italy .............................. 19120 A/87

[51] Int. Cl.⁵ ............................................. F16L 23/00
[52] U.S. Cl. ........................................ 285/18; 285/85;
  285/349; 285/364; 285/379; 285/912; 285/920
[58] Field of Search ................. 285/364, 18, 420, 349,
  285/267, 379, 375, 9 R, 920, 85

[56] References Cited

U.S. PATENT DOCUMENTS

| 382,597 | 5/1888 | Emerson | 285/38 |
|---|---|---|---|
| 1,910,706 | 5/1933 | Malzard | 285/38 X |
| 2,700,559 | 1/1955 | Jensen | 285/375 |
| 3,442,535 | 5/1969 | Frohlich | 285/420 X |
| 3,477,748 | 11/1969 | Tinsley | 285/267 |
| 3,586,350 | 6/1971 | Ashton | 265/420 X |
| 4,142,740 | 3/1979 | Wilms | 285/420 X |
| 4,605,247 | 8/1986 | Alexander et al. | 285/420 X |

FOREIGN PATENT DOCUMENTS

| 2753667 | 6/1974 | Fed. Rep. of Germany | 285/420 |
|---|---|---|---|
| 529334 | 9/1976 | U.S.S.R. | 285/38 |
| 1215000 | 12/1970 | United Kingdom | 285/38 |

Primary Examiner—Dave W. Arola
Attorney, Agent, or Firm—Shlesinger, Fitzsimmons & Shlesinger

[57] ABSTRACT

A coupling device for ducts comprises locking elements constrained to the flange of a first duct which are connected to movement means to move them toward or away from the flange of a second duct. The movement means are actuated by a thrust ring which is rotated around the axis of the first duct. Along the contact side of the flange of the first duct are provided elastically stressed seals which interact between the flange of the first duct and the flange of said connected duct. Said seals consist of floating rings running and oscillating in recesses made in the flange, said floating rings being acted upon by elastic elements inserted in said recesses.

10 Claims, 6 Drawing Sheets

QUICK COUPLING DEVICE FOR DUCTS

The present invention relates to a quick coupling device for ducts used for the connection of ducts subject to severe stresses during use, in particular for connecting a duct installed on a petroleum tank ship with a duct located on a submarine petroleum well platform or on an unloading wharf.

Quick coupling devices such as, for example, those described in my U.S. Pat. No. 4,722,577 are known in the art. In said patent there is described a device comprising some locking elements hinged on the flange of a first duct and arranged at the same distance around the circumference of the duct and which rotate in planes having in common the axis of the duct. Each of said locking elements is connected to one end of a rod having elastically variable length while the other end of the rod is hinged to a thrust ring common to all the rods.

The ring can be rotated alternately between two positions around the axis of the first duct. By rotating the ring in one direction the rods are shortened starting from an oblique and elongated position until they lie parallel to the duct, and are elongated again by elastic thrust, forcing the locking elements to close to engage and hold under pressure the flange of a second duct, which is placed adjacent to the flange of the first one. Rotation of the ring in the opposite direction causes elongation of the rods, which arrange themselves obliquely to the axis of the duct, opening the locking elements and freeing the flange previously restrained.

Elastic lengthening and shortening of the rods are obtained by placing an elastic connecting joint between two mutually aligned portions of rod.

The quick coupling device described undoubtedly permits secure engagement and quick disengagement of the connected ducts but the elastic joint in each rod complicates the structure of the coupling and considerably increases the cost thereof.

In my above-noted patent is described a union for flanged hoses equipped with locking elements born by a supporting structure mounted on the flange of a first duct and obliquely translating toward the axis of said flange. Said locking elements are operated by respective rods translating parallel to the axis of the coupling and in turn operated by a thrust ring turning around the coupling body.

In this case the problem is to assure the necessary locking and sealing pressure.

Furthermore, in order to compensate for any irregularities of thickness of the flange engaged, the abovesaid supporting structure is coupled to the flange of the first duct through a spherical surface which allows rotation of the support structure of the quick coupling device in relation to said flange.

The spherical surface requires accurate machining of the coupled surfaces and considerable complexity of the support structure with the ensuing high cost of the coupling.

In view of this state of the art the object of the present invention is to accomplish a quick coupling having excellent coupling security and quickness of disengagement, being capable of imposing adequate locking pressure, and also being adaptable to flanges of different diameters and/or thicknesses and possibly not perfectly coplanar, the whole with a very simple, light and beneficial structure from the viewpoint of manufacturing costs.

In accordance with the invention said object is achieved by a quick coupling device comprising locking elements constrained to the flange of a first duct and connected to operating means to move them toward and away from the flange of a second duct placed adjacent to that of said first duct, said operating means being actuated by a thrust ring rotated alternately between two positions around the axis of the first duct, characterized in that along the contact side of the flange of said first duct there are provided elastically stressed seals which interact between the flange of the first duct and the flange of said second duct connected to the first.

In other words, the coupling pressure of the two flanges is now assured, not by the rods of elastically variable length as in the coupling which is the object of my above-noted patent, but by the elastically stressed seals provided on the front side of the flange of the first duct.

The reliability of the connection is thus equally assured, as is quickness of disengagement, but the structure is much simpler, lighter and economical than that of the known devices.

In addition, the elastic elements provided on the front side of the flange provide a supporting surface adaptable to the flange to be connected, also compensating for possible irregularities in the surface of the flange connected, thus substituting in a more effective and simpler manner the arrangement described in my above noted patent.

Said seals are preferably made up of floating rings stressed by springs which run in appropriate recesses made in the flange of the first duct between two adjustable limit positions, the first consisting of a rest position in which the springs are not pressed by said floating rings protruding from the flange contact surface, and an operating position in which the flange of a connected second duct presses said floating rings against the springs. The latter are compressed and the floating rings move toward the interior of the recess, having in addition the ability to ocillate therein thanks to a spherical form given their external annular surface.

Figure 2:
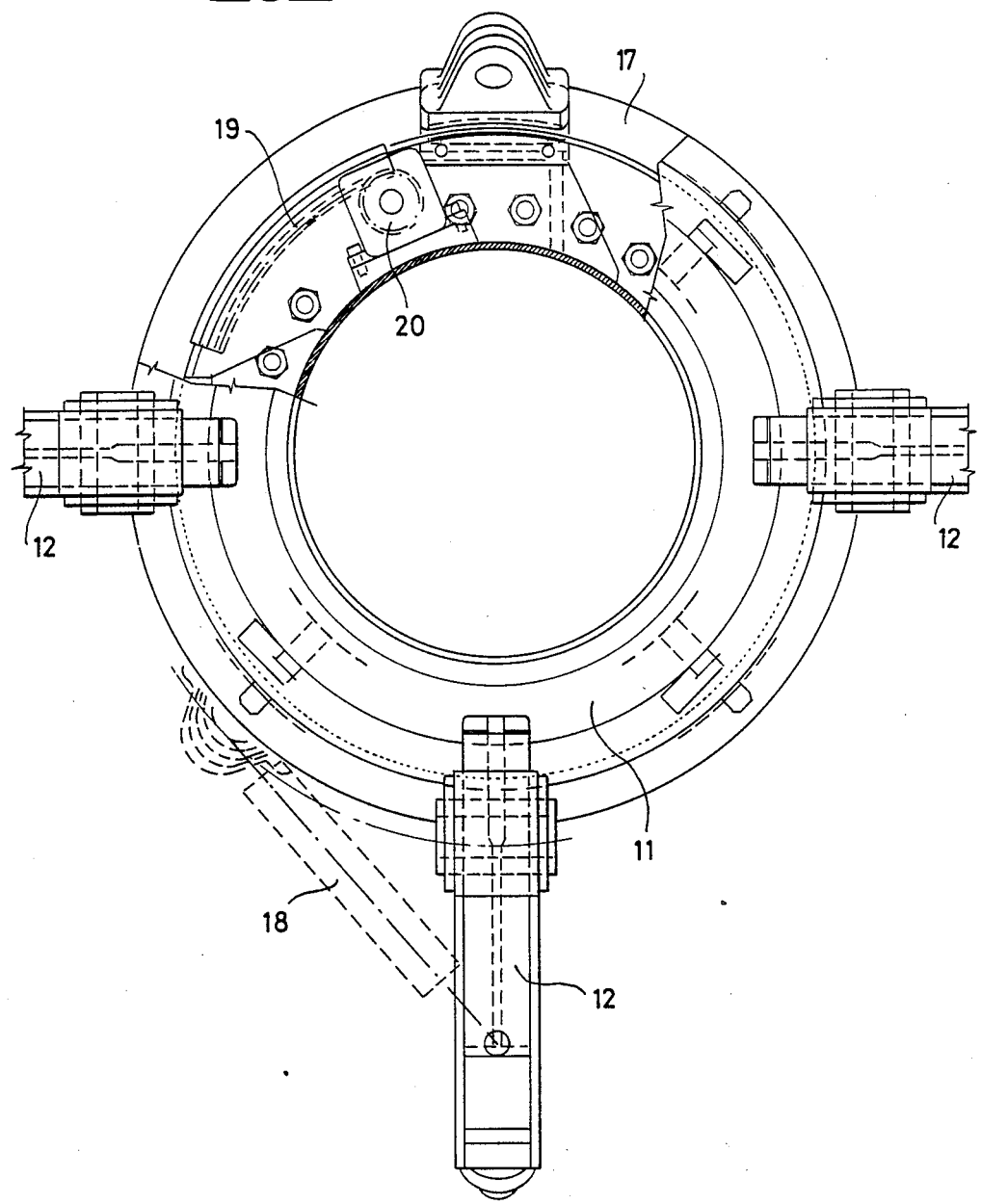
Figure 3:
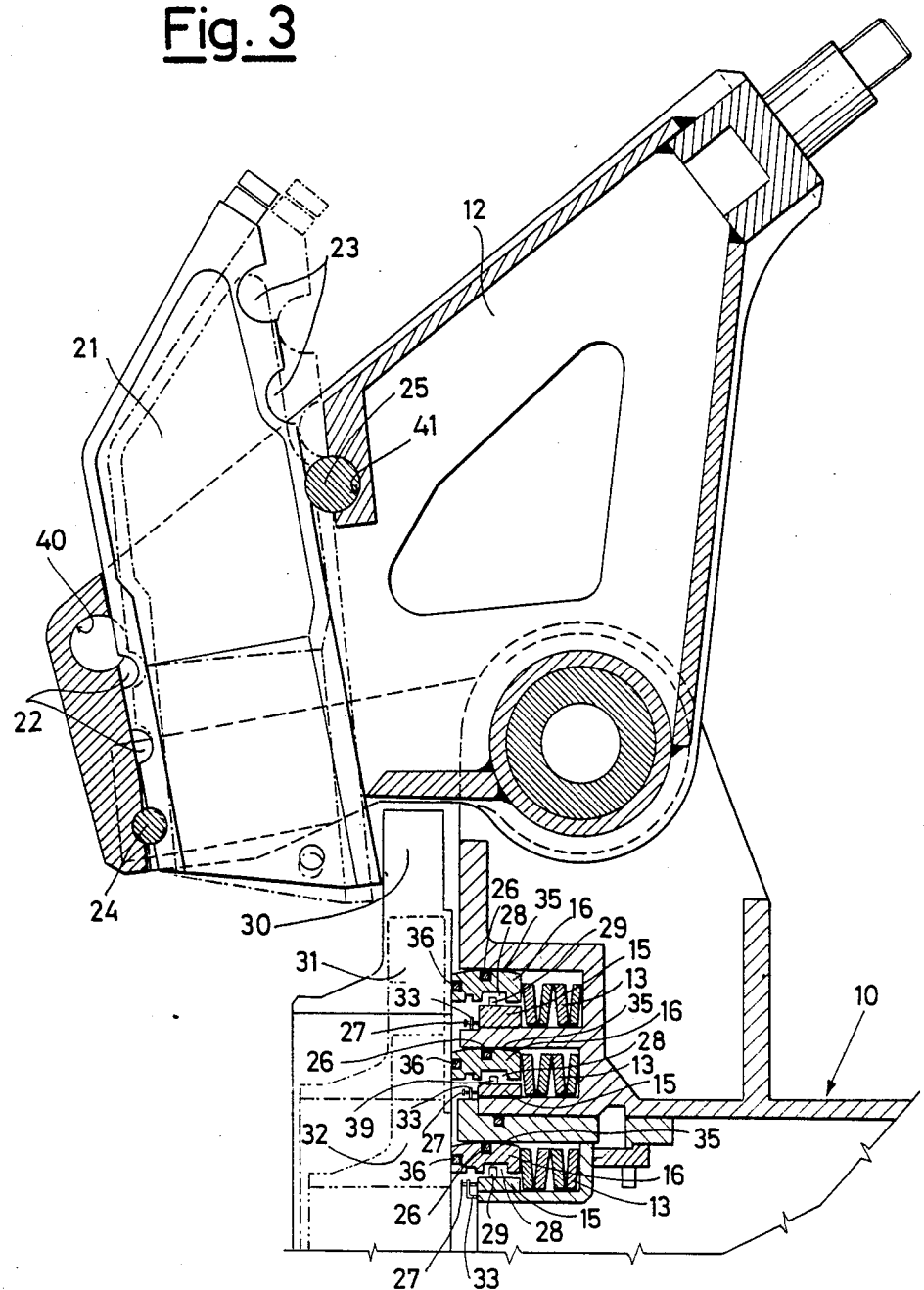
Figure 4:
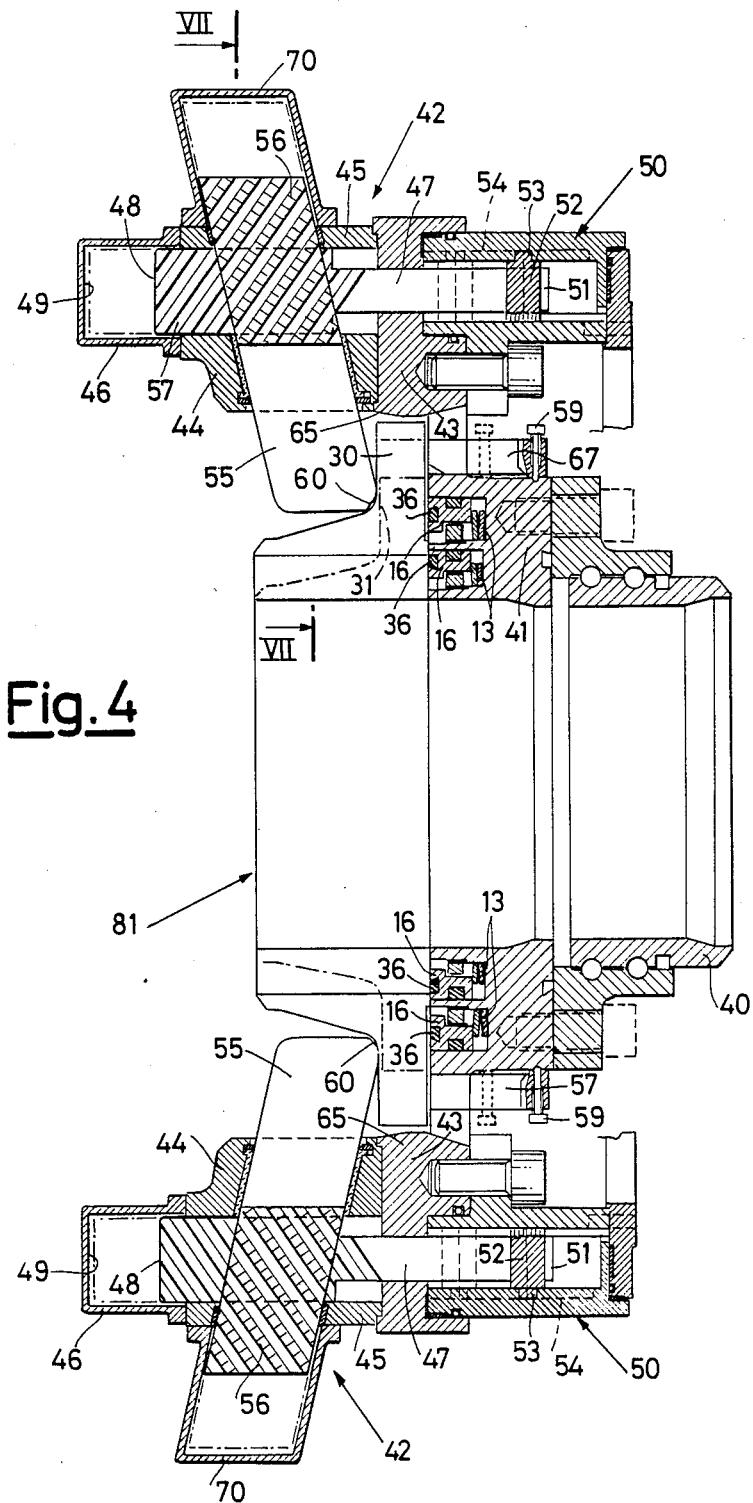
Figure 5:
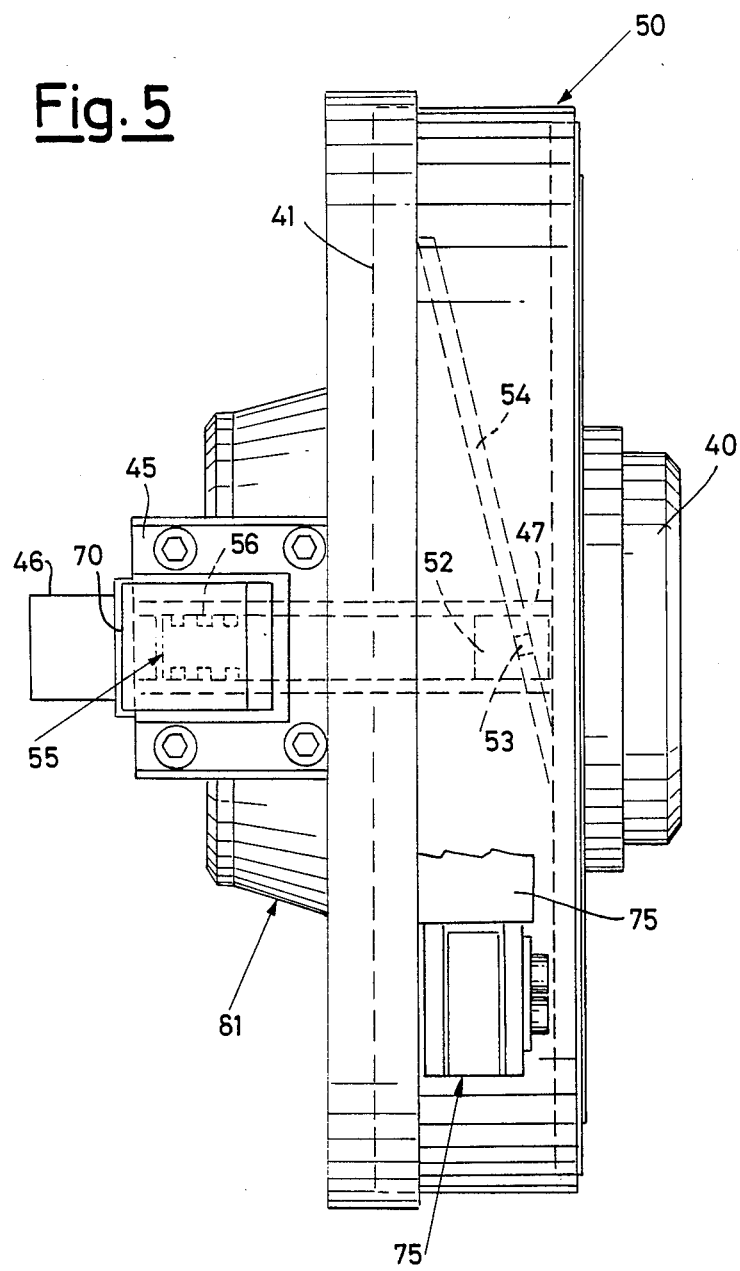
Figure 6:
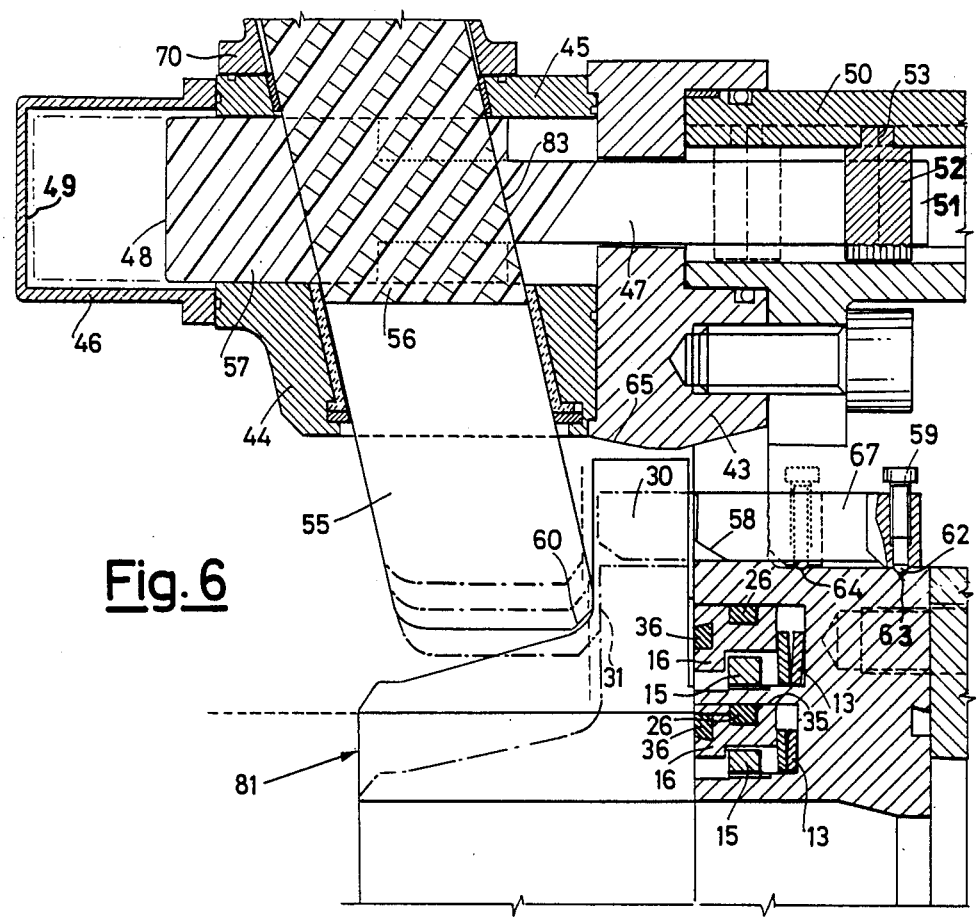
Figure 7:
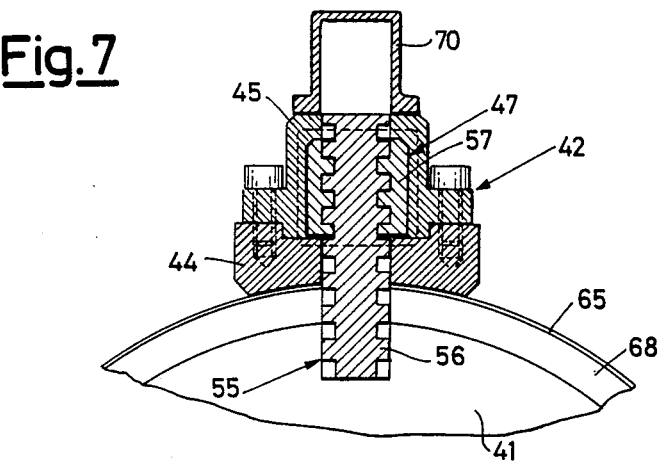

The present invention is applicable in the accomplishment of two quick coupling devices described below as nonlimiting examples and illustrated in the annexed drawings wherein:

FIG. 1 shows a partially sectioned side view of a first quick coupling device in accordance with the present invention, FIG. 2 shows the device of FIG. 1 sectioned along the line II—II of FIG. 1, FIG. 3 shows a sectioned detail of the device of FIG. 1, FIG. 4 shows a second quick coupling device in accordance with the present invention sectioned along the longitudinal axis of the union, FIG. 5 shows a plan view of the abovementioned second device rotated toward the plane of the sheet of FIG. 4, FIG. 6 shows an enlarged cross-section of the device of FIG. 4 in the zone provided for the elastically stressed seals in accordance with the present invention, and FIG. 7 shows an enlarged cross section of a detail along the line VII—VII of FIG. 4.

The same reference numbers have been used in the drawings to indicate the same parts of the device in both the abovementioned accomplishment examples.

With reference to FIG. 1 there is shown a first type of quick coupling device consisting of a first duct 10 having a flange 11 on which are hinged locking elements 12 distributed at equal distances around the circumference of the flange.

Along the contact side of the flange 11 there are arranged elastic elements 13, preferably in the form of Belleville washers, placed in recesses 14 made in said flange.

Said elastic elements 13 interact with floating rings 16, which run in said recesses 14 between two limit positions fixed by adjustable rings 15, and have an external annular surface 35 with spherical form which allows said rings to oscillate around the axis of the duct.

The floating rings 16 are also fitted with seals 26 and 36 along said spherical surface 35 in contact with the wall of the recess 14 and on the outer front surface respectively.

Each floating ring 16 has on its side a groove 28, the ends of which, determining the length of travel of the floating ring 16 in the recess 14, are engaged by a stop 29 integral with the adjacent adjustable ring 15 (FIG. 3).

To adjust the adjustable ring there is provided an adjusting screw 27 connected to said ring 15 and fitted in a support 33 integral with the flange 11.

As may be seen in FIGS. 1 and 2, each locking element 12 is also hinged to the end of a rod 18 of fixed length.

The other end of the rod 18 is hinged to a thrust ring 17 which can rotate around the axis of the duct 10, there being provided a rack 19 (FIG. 2) which is integral with said ring 17 and which couples with a gear 20 operated by a suitable motor 82.

Each locking element has an adjustable jaw 21 (FIGS. 1 and 3) to adapt itself to flanges 30, 31, 32 of different diameters and thicknesses of a second duct 80 coupling with the first. Said jaw 21 has, along the sliding sides in the locking element 12, two sets of notches 22 and 23 in which are inserted stop pins 24 and 25 respectively to fix the desired position of the jaw depending on the dimensions of the flange 30, 31 or 32 of the duct to be connected.

The first quick coupling device described is designed to operate as follows.

The two ducts to be coupled are brought together, one of them being equipped with the described device and also with means (not shown) for facilitating centering of said ducts.

The device has the locking elements open and the jaws already arranged in accordance with the dimensions of the flange 30, 31, 32 of the other duct.

Operating with the motor 82 on the gear 20, which couples with the rack 19 which is integral with the thrust ring 17, the latter is rotated around the axis of the duct 10 bearing the device. The rods 18 are initially inclined as shown in FIG. 2 in broken lines. Being hinged to the ring 17 they straighten out until they reach a position parallel to the axis of the duct. Simultaneously the locking elements 12 rotate and their jaws 21 engage the flange 30, 31 or 32 of the connected duct, pressing it against the floating rings 16 of the flange 11 which are stressed in the direction opposite to that of the spring 13. This assures the necessary engagement pressure of the two flanges and the pressure exerted by the fluid which flows in the duct 10 increases the thrust which is produced between the two coupled flanges.

It should be noted that in this quick coupling device the plurality of floating rings 16 provided in the flange 11 provides perfect adaptation to the various sections of the flanges 30, 31, 32 to be coupled and that, if there are irregularities in the thickness of the flange or local roughness of the contact surface they are compensated for by rotation of the floating ring 16, which is allowed by the spherical outer surface 35 of the latter. The reactive force of the elastic elements is thus uniformly distributed over the surface of the adjacent flanges 11 and 30 or 31 or 32 and consequently increases the effectiveness of the clamping produced by the jaws 21.

Depending on the diameter of the flange 30, 31, 32, it is necessary in the coupling phase to correspondingly adjust the radial position of the moving jaws 21. This is done by inserting the pin 25 in one or the other of the recesses 23 of one side of each jaw 21 and the pin 24 in one or the other of the recesses 22 of the opposite side of said jaw 21, as shown in FIG. 3 where the various radial positions of the jaw 21 are illustrated in unbroken lines (flange 30), dash and dot lines (flange 31), and dash and dot lines (flange 32).

It is also possible, for a given diameter, to adapt the jaws 21, and hence the locking elements 12, to two different thicknesses of the engaged flange. Adaptation is possible by moving the pins 25 from one to the other of opposing seats 40 and 41, as can be seen by comparing FIGS. 1 and 3.

When it is desired to rapidly disengage the ducts, the gear 20 is always rotated in the direction opposite to the preceding one, in such a manner that the ring 17 turns, entraining the rods 18 which, causing the locking elements 12 to rotate, lift the jaw 21 from the retained flange 30, 31 32, thus freeing it.

In the second example of accomplishment shown in FIGS. 4 to 7, the device consists of a first duct 40 with a flange 41 designed to butt frontally against the flange 30 or 31 of a second duct 81 to be connected and equipped with elastic elements 13 housed in recesses 14 made in the flange 41 (FIG. 6).

As described above, the elastic elements 13 are springs and Belleville washers cooperating with floating rings 16 retained by adjustable rings 15 and having an external annular surface 35 with spherical form. Said floating rings 16 have seals 26 and 36 (FIG. 6).

With the flange 41 is associated a quick coupling device formed of three engagement assemblies 42 made integral by an annular support structure 43 placed coaxially around the flange 41 of the first duct 40.

In positions corresponding to those of the three engagement assemblies 42, there extend forward from the support structure 43, parallel to the axis of the connector, three slide bases 44 which form, together with covers 45 and caps or end-of-stroke closed portions 46, guides for the sliding of respective control rods 47 capable of translating linearly in a direction parallel to the axis of the connection between the retracted position of FIG. 4 and an advanced position in which a free end 48 of said control rod 47 has reached the bottom 49 of said closed portions 46 as shown by broken lines in FIG. 6.

Translation of all the rods 47 is controlled simultaneously by a single operating member consisting of a ring or annular thrust bearing 50, cylindrical in form, which is engaged with the opposite end 51 of each control rod 47 by means of respective integral segments 52 carried by the rods and having protruding teeth 53 which run in helical guides or grooves 54 arranged along the inner periphery of the ring 50 (FIG. 5). Rotation of the ring 50 is thus converted into corresponding translations or axial movements of the three control rods 47.

The operating ring 50 is rotated by a hydraulic piston 75 (FIG. 5), which reacts between the flange 41 of the first duct 40 and the turning ring 50, in the manner described in Italian patent application No. 21551 A/85.

Each of the control rods 47 supports and operates a respective element of the three locking elements 55, parallelepiped in form with a beveled edge 60 in the zone of contact with the flange 30 or 31 to be coupled, said elements 55 being transversely slidable intermediate their ends in respective seats 83 formed in the control rods 47, and with their inner ends sliding in bases 44, and their outer ends in the covers 45 and oblique closed portions or caps 70, and in directions oblique to and converging toward the axis of the coupling (FIGS. 4 and 7). Said oblique closed portions 70 are fixed externally to said covers 45.

As shown in FIGS. 4 and 7, each element 55 has two opposite sides equipped with parallel oblique teeth 56 slidably engaged in complementary oblique parallel grooves 57 of the respective control rod 47, thus slidably connecting each locking element 55 to its associated control rod in much the same manner as the locking segments 30 in my U.S. Pat. No. 4,722,557 are connected to the associated control bars 21 shown in that patent. In this manner, the axial translation of each rod 47 is converted into a corresponding oblique translation (with axial component parallel and concordant with that of said axial translation) of the respective element 55, which can thus draw near to or away from the flange 30 or 31 of the duct to be connected with, to tighten it in engaged condition against the flange 41 of the coupling by engagement with the edge 60 (FIG. 4), or allow its withdrawal for disengagement of the duct engaged.

As shown in FIGS. 4 and 6, there is provided a centering system for the ducts to be coupled which consists of several centering elements 67 slidable along the outside of the flange 41 and in a direction parallel to the axis of the flange. The elements 67 have bevels 58 (FIG. 6) which help centering duct 81, and they are locked in fixed positions by screws 59 which screw into said elements 67 and whose rounded tips 62 are received in grooves 63 or 64 located on the surface of the flange 41 in positions corresponding to the retracted position shown in FIG. 6 in unbroken lines or the advanced position shown in dash and dot lines, also in FIG. 6, respectively.

The advanced position of said elements 67 is useful for centering a small-diameter flange 31 while a shoulder 65 of the support structure 43 provides for centering a flange 30.

The coupling device with this second accomplishment of the locking elements operates as follows:

When at rest, the hydraulic piston 75 is extended and the various locking assemblies 42 have all their control rods 47 in advanced position and all the locking elements 55 in the corresponding position moved away from the axis of the coupling.

In this situation a hose with flange 30 or 31 can draw near to the first duct 40, specifically to the flange 41, and be placed in a centered position by the shoulder 65 or the centering elements 67.

At this point the hydraulic piston 75 is retracted to effect rotation of the turning ring 50 and, consequently, the translation of the control rods 47 from the advanced position in which their free end 48 is near the ends 49 of the closed portions 46, to the retracted position of FIG. 4 and, through the toothed coupling 56, 57, the corresponding oblique translation approach of the locking elements 55.

Engaged from behind by the shaping of the locking elements 55, the flange 30 or 31 of the coupled hoses is consequently thrust and held against the flange 41 of the first duct 40, accomplishing a sealed engagement with the gaskets 36 of the rings 16.

From the coupled condition thus achieved, the flange 30 or 31 can only be moved by a disengagement command. Any severe load applied during duty could not cause undesired disconnection since, given the inclination of the locking segments 55 and their engagement with their respective sliding bases 44, the covers 45 and the control rod 47, a stress in this direction is converted into a stress blocking the segments 55 in relation to the bases 44 and the covers 45 and hence blocking of the sliding of the control rod 47.

It is noted that if the flange 30 or 31 is slightly uncoplanar or irregular in thickness, the floating rings 16 of the coupling device rotate, thanks to their spherical surface 35, compensating for said irregularities and thus allowing adaptation of the coupling device to flanges 30 or 31 with imperfect dimensions.

To disengage the connected piping, generally without an applied load, it is of course necessary to operate the hydraulic piston 75 in the opposite direction. Its extension causes rotation of the ring 50 in the direction of disengagement so that the control rods and the locking segments 55 are returned to the neutral position.

I claim:

1. Coupling device for releasably coupling together the confronting ends of a pair of ducts, each of said ends having thereon a flange, and said flanges having thereon contact sides disposed in confronting relation to each other, comprising locking elements mounted on the flange of a first duct of said pair thereof, means for moving said elements in opposite directions, and respectively toward and away from engagement with the flange on the second duct of said pair thereof, thereby selectively to draw said flanges together to couple said ducts together, said moving means including a thrust ring mounted to rotate alternately between two positions around the axis of said first duct, and operatively connected to said elements to impart thereto said movement in opposite directions, sealing means comprising at least one floating ring resiliently mounted in a recess formed coaxially in said contact side of the flange of said first duct and positioned to form a seal between the flanges of said first and second ducts, when said ducts are coupled together by said device, spring means slidably mounted in said recess rearwardly of said floating ring, and means for adjustably retaining said floating ring in said recess against the resistance of said spring means.

2. Device in accordance with claim 1 characterized in that at least one further floating ring is resiliently mounted in another coaxial recess in said contact side of said flange on said first duct, and said floating rings have external annular surfaces which are spherical in form.

3. Device in accordance with claim 2 characterized in that said floating rings are fitted with seals disposed along said spherical surfaces in sliding contact along said recesses and with the surfaces confronting the flange of said second duct.

4. Device in accordance with claim 1 characterized in that said means for moving said locking elements further includes a plurality of rods of fixed length and each of which is hinged at one end to a related locking element while the other end thereof is hinged to said thrust ring.

5. Device in accordance with claim 1 characterized in that each of the locking elements has mounted thereon an adjustable jaw means releasably engageable with the flange of said second duct.

6. Device in accordance with claim 5 characterized in that each of said adjustable jaw means is mounted for sliding adjustment in the related locking element radially of said axis of said first duct, and has in opposite sides thereof, respectively, two sets of notches selectively engageable with stop means to fix the desired position of said jaw depending on the size of the flange on said second duct.

7. Device in accordance with claim 1 including means mounting said locking elements for movement obliquely and radially of said axis of said first duct, said moving means further including a plurality of control rods reciprocable axially by said thrust ring, and operatively connected to said elements through oblique toothings capable of converting axial translation of said rods into a corresponding oblique radial translation of said locking elements with an axial component parallel and concordant with that of said axial translation.

8. Device in accordance with claim 7 characterized in that each of said locking elements has a specially shaped edge for engagement with said flange of said second duct.

9. Device in accordance with claim 7 characterized in that said locking elements are mounted to slide obliquely through openings in said control rods in such a manner as to lock against further movement in said openings in case of an applied load which tends to separate said ducts.

10. Device in accordance with claim 7 characterized in that said control rods are connected by teeth to helices formed in said thrust ring.

* * * * *